United States Patent [19]
Zepeda, Sr.

[11] Patent Number: 5,396,726
[45] Date of Patent: Mar. 14, 1995

[54] FISH BITE INDICATOR

[76] Inventor: Lawrence Zepeda, Sr., 1131 Easy La., Nipomo, Calif. 93444

[21] Appl. No.: 220,819

[22] Filed: Mar. 30, 1994

[51] Int. Cl.⁶ .............................................. A01K 97/12
[52] U.S. Cl. ......................................................... 43/17
[58] Field of Search ........................ 43/17, 19.2, 25, 16

[56] References Cited

U.S. PATENT DOCUMENTS

| | | | |
|---|---|---|---|
| 3,680,244 | 8/1972 | Cala | 43/17 |
| 3,878,635 | 4/1975 | Trosper et al. | 43/17 |
| 4,541,195 | 9/1985 | Delaney | 43/17 |
| 4,633,608 | 1/1987 | Savarino | 43/17 |

*Primary Examiner*—P. Austin Bradley
*Assistant Examiner*—Jeanne M. Elpel
*Attorney, Agent, or Firm*—McCubbrey, Bartels & Ward

[57] ABSTRACT

A fish bite indicator in combination with a fishing rod and reel is provided to give an audible and/or a visual signal when the fishing line is under sufficient state of tension. An oscillating arm of the indicator extends below the rod. The fishing line is threaded in a loop at the end of the oscillating arm below the rod in such a way to cause the arm to move upward toward the rod when the line has sufficient tension to indicate a fish strike. The other operative elements of the indicator include an on/off switch, a switch activating cam that is attached to a portion of the oscillating arm for activating the on/off switch, an alarm means electrically connected to the switch for, and a battery power source for the alarm means.

32 Claims, 4 Drawing Sheets

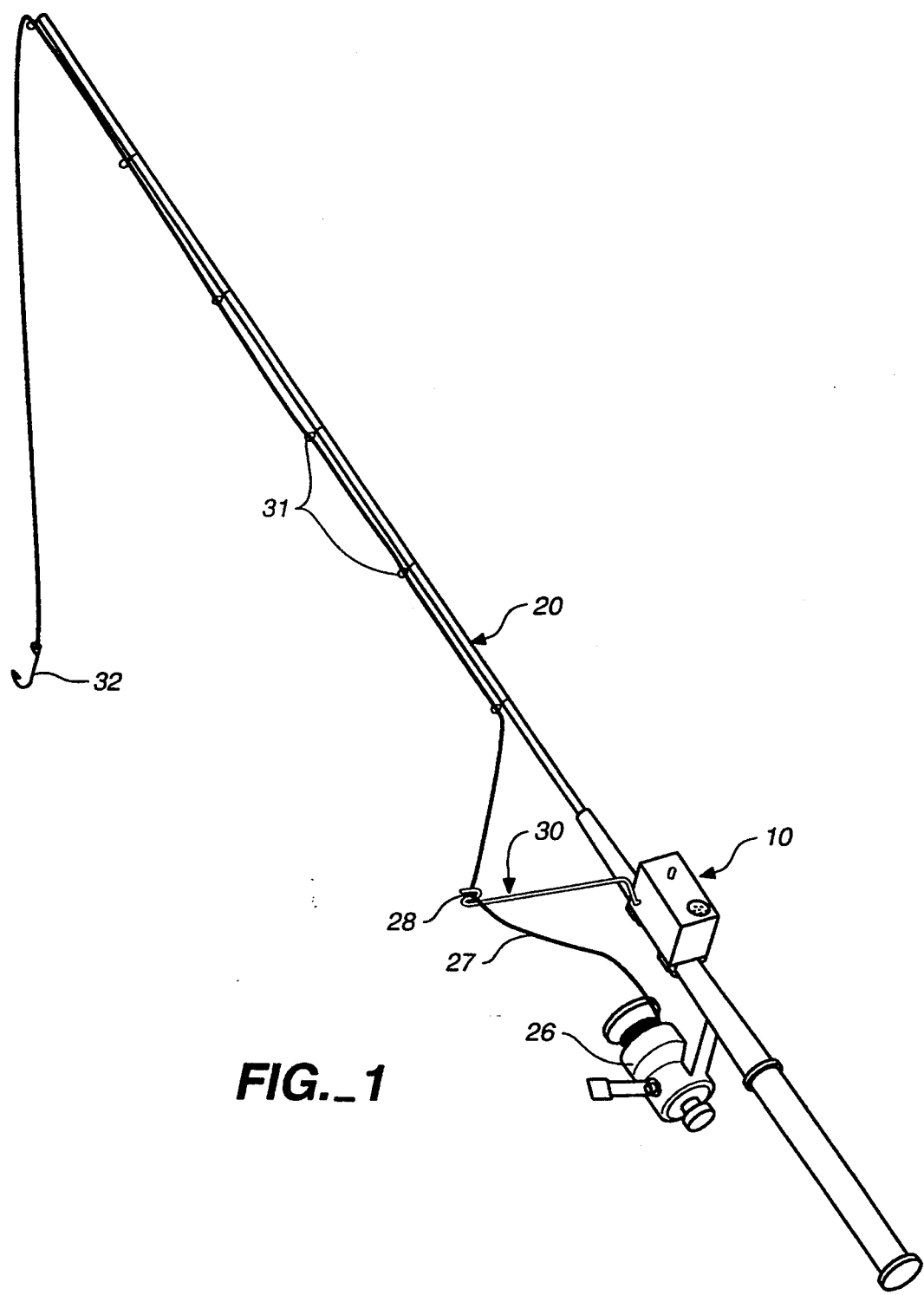
FIG._1

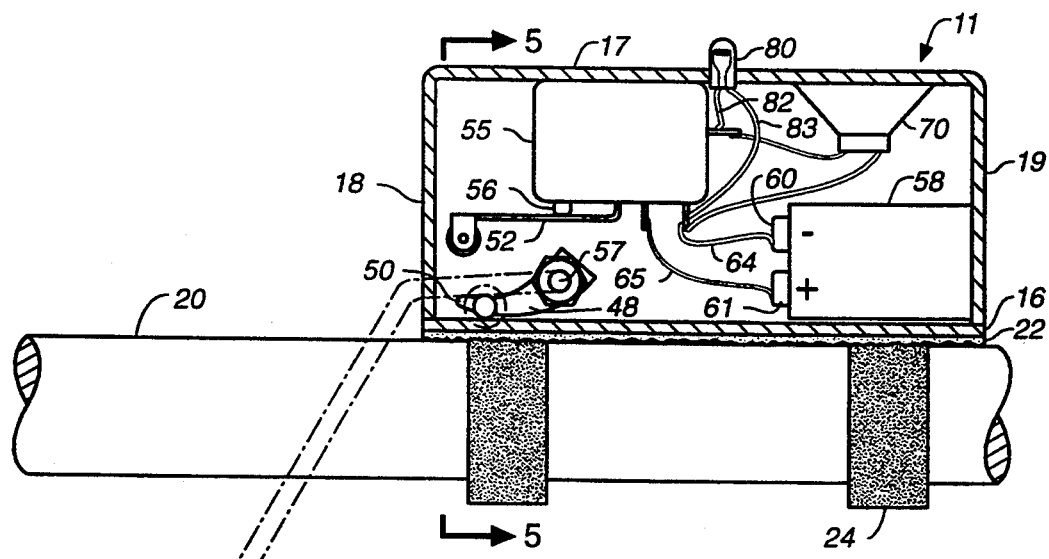
FIG._2
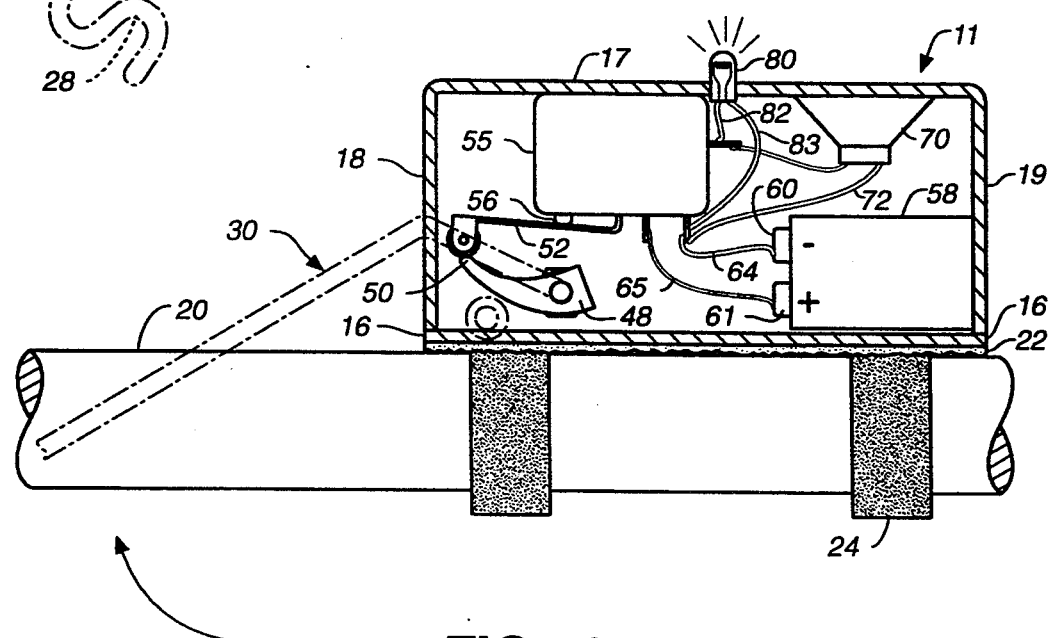
FIG._3

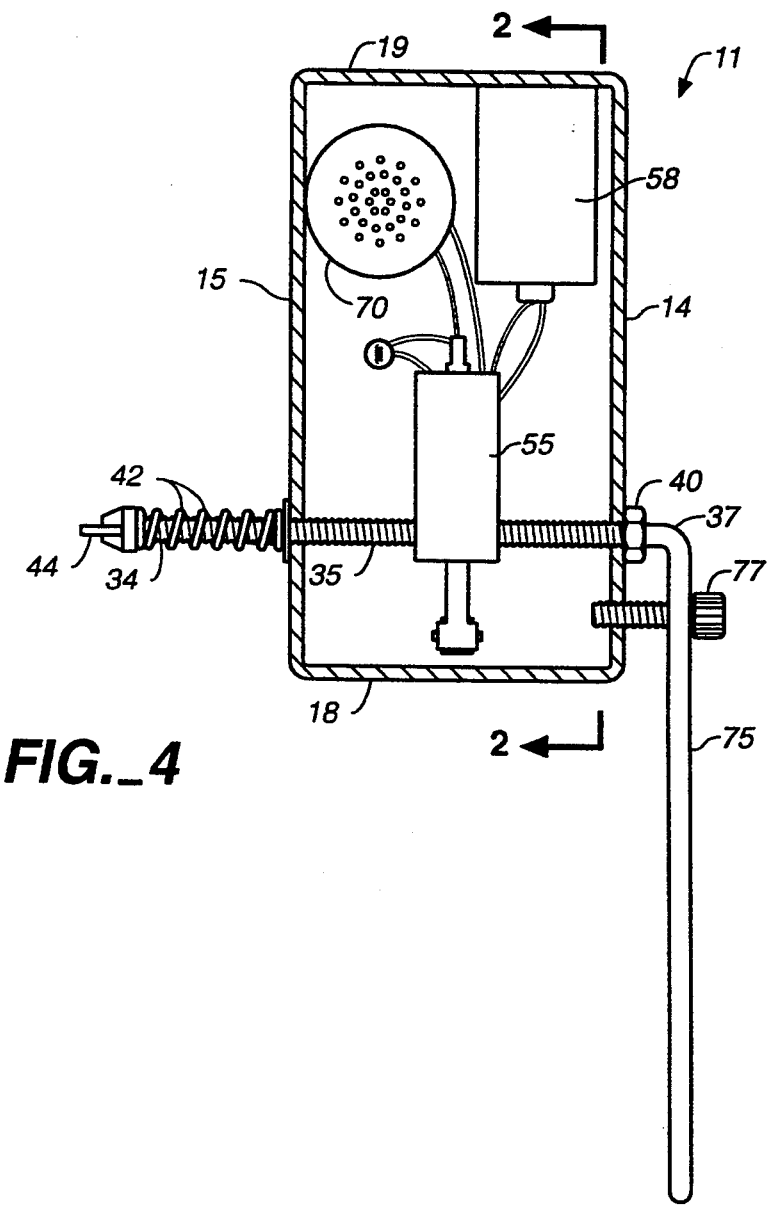
FIG._4
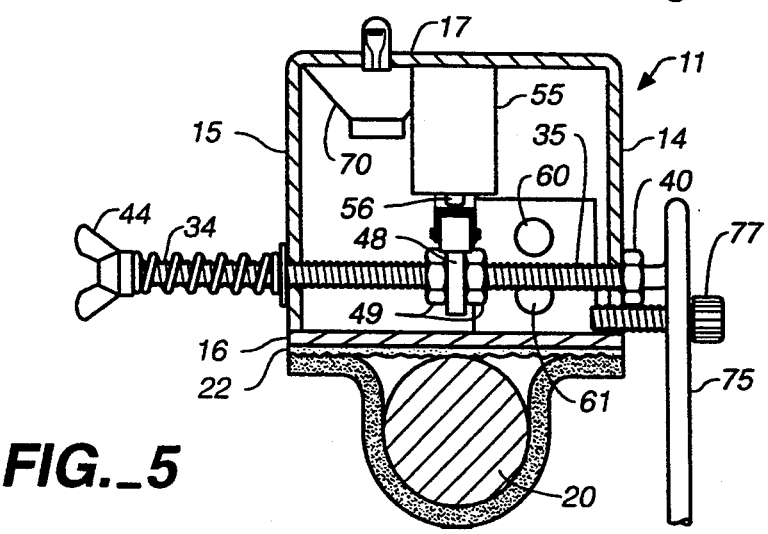
FIG._5

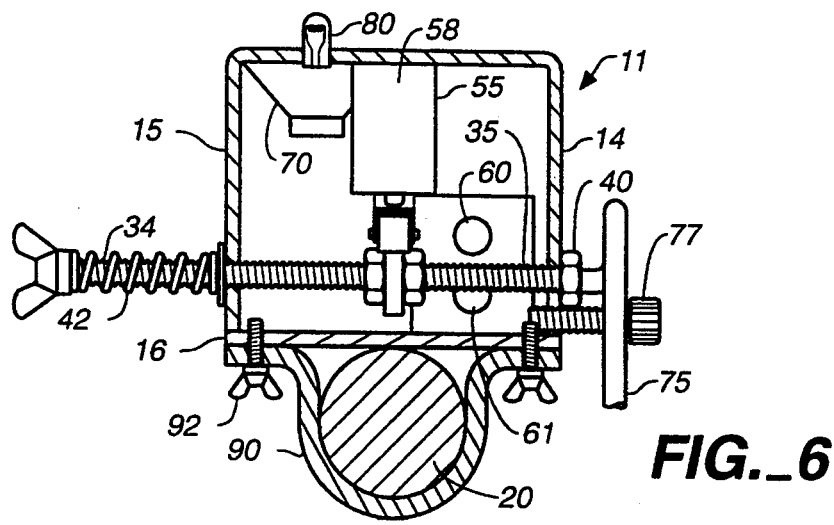
FIG._6
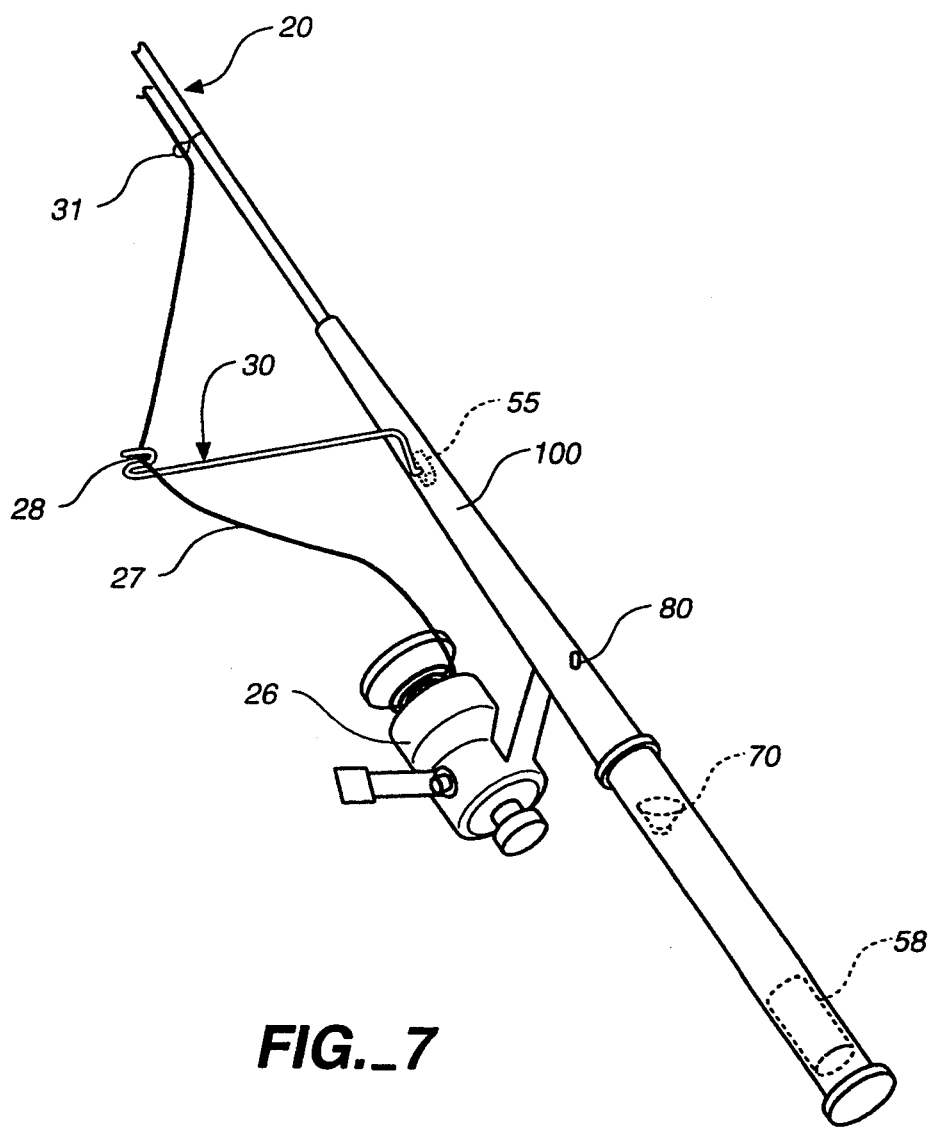
FIG._7

5,396,726

FISH BITE INDICATOR

FIELD OF THE INVENTION

This invention relates generally to the field of fish bite indicators for use in combination with a fishing rod and a reel of fishing line.

BACKGROUND OF THE INVENTION

Numerous fish bite indicators have been developed over the years, but they have failed to become popular because of their tendency to be either ineffective or so elaborate that they are too costly to the average sports fisherman. Examples of prior art bite indicators are disclosed and claimed in U.S. Pat. Nos. 4,006,550; 4,573,281; 4,660,316; 5,010,678; 5,088,223; 5,157,857; 5,182,873; and 5,228,228.

U.S. Pat. No. 4,006,550 has the desired simplicity. However, with the line fed through a loop at the end of the indicator above the reel, the indicator lacks sufficient sensitivity control for distinguishing fish strikes from wave action on the line and other environmental conditions. Furthermore, the indicator would be ineffective for the visually impaired.

U.S. Pat. Nos. 5,010,678 and 5,088,223 disclose fish bite indicators for the visually impaired. However, these indicators are examples of those that lack the simplicity of the indicator of the present invention.

U.S. Pat. No. 5,288,228 also discloses an indicator for the visually impaired. However, this indicator operates when there is significant movement of the tip of the reel. Such an indicator would be ineffective in high winds, heavy surf, high swells and other similar environmental conditions.

The other prior art patents listed above are of general interest to show the state of the art of various indicators having alarms for alerting a fisherman to the presence of a hooked fish on the line of a fishing rig.

SUMMARY OF THE INVENTION

The fish indicator for a fishing rod and reel of the present invention has the desired simplicity and solves the problem of greater sensitivity control to distinguish between a fish strike and environmental conditions.

The bite indicator of the present invention comprises either a housing that is easily mountable on the fishing rod or a portion of a hollow handle of the rod adjacent to the reel and an oscillating arm extending from the housing to a position below the rod. The fishing line is threaded in a loop at the end of the oscillating arm below the rod in such a way to cause the arm to move upward toward the rod when the line has sufficient tension to indicate a fish strike. Included within the housing or the hollow handle of the rod are:

(1) an on/off switch;
(2) a switch activating arm that is attached to a portion of the oscillating arm for activating the on/off switch when a taut fishing line causes the end of the oscillating arm to move upward toward the rod;
(3) an alarm means electrically connected to the switch for indicating the line is in tension; and
(4) a battery power source for the alarm means electrically connected to the switch.

In one embodiment of the fish indicator of the present invention, referred to as the fish indicating beeper, the alarm means comprises an audible alarm means, e.g. a piezo-electric beeper found in smoke alarms. In another embodiment of the fish indicator of the present invention, referred to as the fish indicating light, the alarm means comprises a visual alarm means, e.g. either a simple flashlight bulb or a light emitting diode. In a preferred embodiment of the present invention, referred to as the fish indicating beeper and light, the alarm means comprises a combination of the audible alarm means and the visual alarm means.

BRIEF DESCRIPTION OF THE DRAWINGS

FIG. 1 is an isometric view of a fishing rod and reel with the preferred embodiment of the present invention, the fish indicating beeper and light, mounted thereon;

FIG. 2 is a longitudinal, vertical sectional view taken along line 2—2 of FIG. 3, partially in phantom, of the preferred embodiment of the present invention in its normal non-indicating mode;

FIG. 3 is a longitudinal, vertical sectional view taken along line 2—2 of FIG. 3, partially in phantom, of preferred embodiment of the present invention in its fish indicating mode;

FIG. 4 is a top sectional view of the preferred embodiment of the present invention in its normal non-indicating mode;

FIG. 5 is a front sectional view, of the preferred embodiment of the present invention in its indicating mode illustrating one method for attaching the housing to the rod;

FIG. 6 is a front sectional view, of the preferred embodiment of the present invention in its indicating mode illustrating another method for attaching the housing to the rod;

FIG. 7 is a partial isometric view of a fishing rod and reel in which the fish indicator is integrally combined within the rod.

DETAILED DESCRIPTION OF THE PREFERRED EMBODIMENT

A functional prototype of fish indicating beeper and light 10 as shown in FIGS. 1–5 was built using readily available materials. The housing for beeper and light 10 was a translucent plastic box 11 having the approximate dimensions of 1.5 inches in height, 1.75 inches in width and 3.25 inches in length and having right side 14, left side 15, removable bottom 16, top 17, front 18 and back 19. Box 11 was mounted on a conventional rod 20 by means of Velcro pad 22 that was glued to bottom 16. Specifically, box 11 is attached in one embodiment of the present invention, by means of pad 22 to corresponding Velcro pads 24, which in turn are wrapped around rod 20 adjacent to reel 26. After beeper and light 10 was mounted to rod 20, fishing line 27 was threaded through loop 28 of oscillating arm 30 and guides 31 and tied to hook 32. Loop 28 can be closed, but preferably loop 28 is open as shown for the convenience.

Referring now to FIGS. 2–5, one end 34 of threaded lateral section 35 of oscillating arm 30 was mounted through an opening in left side 15 of box 11 as shown in FIG. 4. Lateral section 35 extends through box 11 and passes through an opening in right side 14 to bend 37 as shown in FIG. 4. Fastener 40 on threaded portion of lateral section 35 adjacent bend 37 was tightened against right side 14. Spring 42 encircled one end 34 that protruded from left side 15. Fastener 44 was tightened against spring 42 and a washer as shown in FIGS. 4–6 to vary the tension of oscillating arm 30. It is apparent as fastener 44 was tightened to increase the compression of spring 42, the sensitivity of arm 30 to normal environmental conditions of line 21 was diminished and its ability to distinguish a fish strike from such normal conditions was increased. Switch activating arm 48 was fixedly attached to lateral section 35 by means of fasteners 49 threaded onto lateral section 35 so that arm tip 50 was in alignment with the end of arm 52 of an on/off switch 55 which was mounted adjacent to top 17. Arm 48 oscillated around point 57 on lateral section 35. Although the specific type of switch that was used was a 10 amp Snap Action Low Force switch, catalog no. 35-927 manufactured by Calectro, GC Electronics, Division of Hydrometals, Inc. of Rockford, Ill. 61101, any conventional on/off switch can be easily adapted for use with the present indicator. Arm 52 as an integral part of switch 55 engaged and disengaged on/off button 56. Switch 55 was mounted on a rod (not shown) which was fixedly attached within box 11 between left side 15 and right side 14. An ordinary 9 volt battery 58, e.g. Duracell® alkaline battery, MN1604 was placed within box 11 adjacent to back 19 and bottom 16 of box 11. For ease of removal, the battery in the prototype as shown was not securely fastened to box 11. It is envisioned that the battery would be designed to fit snugly in a plastic sleeve or other type of brackets. A conventional battery cap (not shown) of battery 58 was placed over negative terminal 60 and positive terminal 61 of battery 58 with the respective negative and positive lead wires 64 and 65 making the respective electrical connections to switch 55. A 15 amp beeper 70, e.g. the Buzzer, catalog no. J4-816, manufactured by Calectro, GC Electronics, Division of Hydrometals, Inc. of Rockford, Ill. 61101, was used as the audible alarm means and was mounted within box 11 adjacent back 19 and top 17 of box 11. Any similar type of beeper may be used. Negative and positive lead wires 72 and 74 of beeper 70 were respectively connected to the corresponding contacts of switch 55.

In the preferred embodiment, optical fish indicating light bulb 80, e.g. an ordinary 6 volt bulb, as shown in FIGS. 2, 3, 5 and 6, is mounted into top 17 of box 11. In the specific prototype that was built, bulb 80 was glued to an opening in front 18 of box 11 and bulb 80 was placed into operable contact with switch 55 and battery 58 by means of the respective positive and negative leads 82 and 83 as shown in FIGS. 2-3.

When line 27 was not under tension, means were provided for resting oscillating arm in a non-switch activating position. Specifically, the portion of longitudinal section 75 adjacent to bend 37 of lateral section 35 of oscillating arm 30 rested against arm holder 77, i.e. a bolt that was threaded into right side 14 of box 11. During use and when a fish struck and placed tension on line 27, arm 30 moved upward toward rod 20 to cause arm tip 50 to engage arm 52 of switch 55, which in turn caused beeper 70 to emit the recognizable sound and bulb 80 to shine.

Beeper and light 10 can be designed so that if rod 20 and indicator 10 are dropped to cause oscillating arm 30 to rotate past the engagement of arm 48 with switch 55 without damage to the switch. One means for doing this is to allow sufficient clearance between arm tip 50 and the end of switch 55 so that arm tip 50 no longer engages switch 55 after it rotates an arc of about 5°. Specifically, point 57 around which arm 48 oscillated in the preferred embodiment described above can be moved down and toward front 18, in an embodiment not shown, which allows arm 48 to be rotated completely past the engagement with button 56 without causing injury to any of the elements making up the fish indicator in the event of droppage or other abnormal movement of arm 30.

In another embodiment of the present invention, one may incorporate a means for retracting oscillating arm 30 to its original, non-switch activating position after a fish has struck hook 32. This can comprise attaching one end of a spring (not shown) to a portion of lateral section 35 adjacent bend 37 and the other end of the spring to right side 14.

Referring to FIG. 6, an alternative method of attaching beeper and light 10 to rod 20 is shown in which bottom 16 is attached to rod 20 by means of U clamps 90 and bolts 92.

FIG. 7 illustrates another embodiment of the indicator of the present invention in which the indicator forms an integral part of the fishing rod. In this embodiment, the internals of box 11 shown in FIGS. 2-5, e.g. switch 55, beeper 70, battery 58 and bulb 80, are operably mounted within or on hollow handle 100 of rod 20 and oscillating arm 30 extends from rod 20 as shown. It this embodiment, instead of the box-type housing described above, the housing is cylindrical with a circular cross-section. It is apparent that the indicator may have other cross-sections from square, rectangular, octagonal and the like.

The preferred embodiment of the present invention has been illustrated as a fish indicating beeper and light, it is apparent that it may be easily modified by removing bulb 80 and lead wires 82 and 83 to result in a fish indicating beeper. Alternatively, beeper 70 and the respective lead wires may be removed to result in a fish indicating light. Without departing from the spirit and scope of this invention, one of ordinary skill in the art can make many other changes and modifications to the indicator of the present invention to adapt it to specific usages and conditions. As such, these changes and modifications are properly, equitably, and intended to be, within the full range of equivalents of the following claims.

What is claimed is:

1. A fish bite indicator for use in combination with a fishing rod having a reel and line extending therefrom, said indicator comprising:
    (a) an oscillating arm extending away from the longitudinal axis of the rod to a position below the rod and having the line operably threaded adjacent to the end of said arm below the reel,
    (b) an on/off switch,
    (c) a switch activating arm operably attached to portion of said oscillating arm for activating said on/off switch when the line is in sufficient tension to move the end of said oscillating arm toward the rod,
    (d) an alarm means electrically connected to said switch for indicating the line is in tension, said alarm means comprising an audible means, and
    (e) battery power source for said alarm and electrically connected to said switch.

2. The fish bite indicator of claim 1 wherein said alarm means also comprises a visual alarm means attached to the exterior of said rod.

3. The fish bite indicator of claim 2 wherein said visual alarm comprises a light bulb.

4. The fish bite indicator of claim 1 wherein said audible alarm means comprises a beeper.

5. The fish bite indicator of claim 1 wherein said alarm means also comprises a visual alarm means attached to the exterior of said rod and said audible alarm means attached within the interior of said rod.

6. The fish bite indicator of claim 1 wherein an oscillating arm tensioning means is attached to said arm for changing the sensitivity of said switch activating arm.

7. The fish bite indicator of claim 1 wherein spring means is operably attached to said oscillating arm to return said switch activating arm to its original non-switch activating position.

8. The fish bite indicator of claim 1 wherein clip means are used to mount a housing for said on/off switch, switch activating arm, said audible alarm means and battery power source onto the rod adjacent to the reel.

9. The fish bite indicator of claim 1 wherein Velcro pads are used to mount a housing for said on/off switch, switch activating arm, said audible alarm means and battery power source onto the rod adjacent to the reel.

10. The fish bite indicator of claim 1 wherein said rod has a hollow handle to serve as a housing to said on/off switch, switch activating arm, said audible alarm means and battery power source.

11. A fish bite indicator for use on a fishing rod having a reel and line extending therefrom, said indicator comprising:
(a) a housing having front and back ends, a bottom mountable on the rod adjacent to the reel and its longitudinal axis parallel to that of the rod;
(b) an oscillating arm having a lateral section extending from a first end laterally through said housing to a longitudinal section extending along the longitudinal axis to a position below the rod, and a loop adjacent to a second end of said arm below the reel for maintaining the line below the longitudinal section of said arm;
(c) an on/off switch attached within said housing;
(d) a switch activating arm fixedly attached within said housing to a portion of the lateral section of said oscillating arm for activating said on/off switch when the line is in sufficient tension to move the loop of said oscillating arm upward toward the rod;
(e) an alarm means electrically connected to said switch for indicating the line is in tension; and
(f) a battery power source for said alarm attached within said housing and electrically connected to said switch.

12. The fish bite indicator of claim 11 wherein said alarm means comprises visual alarm means attached to the exterior of said housing.

13. The fish bite indicator of claim 12 wherein said visual alarm comprises a light bulb or a light emitting diode attached to the front end of said housing.

14. The fish bite indicator of claim 11 wherein said alarm means comprises audible alarm means mounted within said housing.

15. The fish bite indicator of claim 14 wherein said audible alarm means comprises a piezo-electric beeper within said housing.

16. The fish bite indicator of claim 11 wherein said alarm means comprises a visual alarm means attached to the exterior of said housing and an audible alarm means mounted within said housing.

17. The fish bite indicator of claim 11 wherein said alarm comprises a piezo-electric beeper within said housing and a light bulb or a light emitting diode attached to said housing.

18. The fish bite indicator of claim 11 wherein an oscillating arm tensioning means is attached to the lateral section adjacent to the first end of said arm exterior to said housing for changing the sensitivity of said switch activating arm.

19. The fish bite indicator of claim 18 wherein a first portion adjacent to the first end of said arm is laterally extended exterior to housing and wherein said tensioning means comprises a spring encircling said first portion and a fastener to vary the compression on said spring.

20. The fish bite indicator of claim 11 wherein spring means is operably attached to said oscillating arm to return said switch activating arm to its original non-switch activating position.

21. The fish bite indicator of claim 11 wherein a second portion of the lateral section adjacent to the longitudinal section is laterally extended exterior to said housing and wherein said spring means comprises a spring attached between said second portion and the exterior of said housing.

22. The fish bite indicator of claim 11 wherein clip means are used to mount the bottom of said housing to the rod.

23. The fish bite indicator of claim 11 wherein Velcro pads are used to mount the bottom of said housing to the rod.

24. The fish bite indicator of claim 11 wherein said bottom is removable.

25. The fish bite indicator of claim 11 wherein means are provided for resting oscillating arm in a non-switch activating position.

26. A fish bite indicator for use on a fishing rod having a hollow handle, a reel and line extending therefrom, said indicator comprising:
(a) an oscillating arm having a lateral section extending from a first end laterally through the handle of said rod adjacent to said reel to a longitudinal section extending along the longitudinal axis of said rod to a position below the rod, and a loop adjacent to a second end of said arm below the reel for maintaining the line below the longitudinal section of said arm;
(b) an on/off switch attached within the hollow handle;
(c) a switch activating arm fixedly attached within said handle to a portion of the lateral section of said oscillating arm for activating said on/off switch when the line is in sufficient tension to move the loop of said oscillating arm upward toward the rod;
(d) a visual alarm means electrically connected to said switch for indicating the line is in tension;
(e) an audible alarm means electrically connected to said switch for indicating the line is in tension; and
(f) a battery power source for said audible alarm and for said visual alarm attached within the handle and electrically connected to said switch.

27. The fish bite indicator of claim 26 wherein said visual alarm means comprises a light bulb or a light emitting diode attached said handle.

28. The fish bite indicator of claim 27 wherein said audible alarm means comprises a beeper 29. The fish bite indicator of claim 26 wherein an oscillating arm tensioning means is attached to the lateral section adjacent to the first end of said arm exterior to said handle for changing the sensitivity of said switch activating arm.

30. The fish bite indicator of claim 29 wherein a first portion adjacent to the first end of said arm is laterally extended exterior to housing and wherein said tensioning means comprises a spring encircling said first portion and a fastener to vary the compression on said spring.

31. The fish bite indicator of claim 26 wherein spring means is operably attached to said oscillating arm to return said switch activating arm to its original non-switch activating position.

32. The fish bite indicator of claim 31 wherein a second portion of the lateral section proximate to the longitudinal section is laterally extended exterior to said handle and wherein said spring means comprises a spring attached between the other end of the lateral section and exterior of said handle.

* * * * *